UNITED STATES PATENT OFFICE.

GUNNAR GUSTAFSON, OF AVESTA, AXEL AUGUST JUNGMARKER, OF STOCKHOLM, AND KARL ALBERT CASPERSSON, OF ENGELSBERG, SWEDEN.

METHOD OF PRODUCING SILICON-MANGANESE-CHROME STEEL.

1,423,847.    Specification of Letters Patent.    Patented July 25, 1922.

No Drawing.    Application filed March 17, 1921. Serial No. 452,995.

*To all whom it may concern:*

Be it known that we, GUNNAR GUSTAFSON, AXEL AUGUST JUNGMARKER, and KARL ALBERT CASPERSSON, subjects of the King of Sweden, residing at Avesta, Stockholm, and Engelsberg, Sweden, respectively, have invented new and useful Methods of Producing Silicon - Manganese - Chrome Steel, of which the following is a specification.

In producing silicon - manganese - chrome steel in a Martin or open hearth furnace by introducing the alloying ferro material required as ferro-silicon, ferro manganese, and ferro chrome directly into a Martin furnace immediately before the tapping operation, a steel having a comparatively high percentage of carbon will be obtained, inasmuch as an increase of the percentage of carbon will result from the high carbon content, ferro additions even if the percentage of carbon of the steel prior to the introduction of these alloying additions were very low. When a basic Martin furnace is used, also a great deal of the silicon will enter into the slag, as silicon is prone to unite with the basic lining of the furnace.

This invention has for its object to provide a method of producing silicon-manganese-chrome steel having a low percentage of carbon and in which the loss of alloying additions will be exceedingly small.

The new method is carried out as follows: First there is produced in well known manner a steel containing the quantity of carbon desired, and said operation may, preferably, be accomplished in a Martin furnace. Immediately before the tapping of the ready prepared steel, the amount of ferro manganese required is added directly in the furnace. The molten steel is then tapped into a ladle, whereupon the amount of ferro silicon and ferro chrome required, melted together previously preferably in an electric furnace, is added to the steel directly in the ladle.

By this invention there is obtained amongst others the advantage of avoiding the carbonization of the steel bath in the Martin furnace. We are thus enabled to avoid too high a carbon content in the finished steel by reason of the high carbon content of the ferro-additions for the reason that by melting the ferro-additions in an electric furnace nearly all of their carbon content may be removed in graphitic form, sometimes called kish, which remains in the electric furnace so that when the alloy is tapped from the electric furnace it contains but a fraction of a percent of carbon. This small carbon content will then not unduly raise the carbon content of the molten steel to which the molten ferro-additions are added.

We claim:—

The method of making open hearth steel which comprises producing basic open-hearth steel, adding thereto ferro-manganese and then adding to the metal a previously melted decarburized alloy of ferro-chrome and ferro-silicon.

In testimony whereof we have signed our names.

GUNNAR GUSTAFSON.
AXEL AUGUST JUNGMARKER.
KARL ALBERT CASPERSSON.